US012585340B2

(12) United States Patent
Abdulla et al.

(10) Patent No.: US 12,585,340 B2
(45) Date of Patent: Mar. 24, 2026

(54) TRACKING A PAIRED PERIPHERAL INPUT DEVICE BASED ON A CONTACT CRITERION

(71) Applicants: Waleed Abdulla, Sunnyvale, CA (US); Sree Harsha Kalli, Santa Clara, CA (US); Mohamed Selim Ben Himane, Milpitas, CA (US)

(72) Inventors: Waleed Abdulla, Sunnyvale, CA (US); Sree Harsha Kalli, Santa Clara, CA (US); Mohamed Selim Ben Himane, Milpitas, CA (US)

( * ) Notice: Subject to any disclaimer, the term of this patent is extended or adjusted under 35 U.S.C. 154(b) by 0 days.

(21) Appl. No.: 18/200,766

(22) Filed: May 23, 2023

(65) Prior Publication Data

US 2023/0288996 A1    Sep. 14, 2023

Related U.S. Application Data

(63) Continuation of application No. 17/850,105, filed on Jun. 27, 2022, now Pat. No. 11,693,491.

(60) Provisional application No. 63/236,154, filed on Aug. 23, 2021.

(51) Int. Cl.
| | |
|---|---|
| *G06F 3/0346* | (2013.01) |
| *G06F 1/16* | (2006.01) |
| *G06F 3/0354* | (2013.01) |
| *G06F 3/038* | (2013.01) |

(52) U.S. Cl.
CPC .......... *G06F 3/0346* (2013.01); *G06F 1/1694* (2013.01); *G06F 3/03545* (2013.01); *G06F 3/0383* (2013.01)

(58) Field of Classification Search
CPC ...................................................... G06F 3/0346
See application file for complete search history.

(56) References Cited

U.S. PATENT DOCUMENTS

| | | | |
|---|---|---|---|
| 10,373,342 B1 * | 8/2019 | Perez, III | ................ G06F 3/011 |
| 10,459,538 B2 | 10/2019 | Peretz et al. | |
| 10,620,725 B2 | 4/2020 | Siddiqui et al. | |
| 10,884,505 B1 * | 1/2021 | Huo | ........................ G06F 3/012 |
| 11,373,271 B1 * | 6/2022 | Da Silva Quelhas | .... G06T 7/50 |
| 2013/0033418 A1 * | 2/2013 | Bevilacqua | ............. G06F 3/017 |
| | | | 345/156 |
| 2017/0011553 A1 | 1/2017 | Chen et al. | |
| 2018/0059901 A1 * | 3/2018 | Gullicksen | .......... G06F 3/04815 |
| 2018/0239444 A1 | 8/2018 | Siddiqui et al. | |
| 2019/0243472 A1 * | 8/2019 | Stafford | .............. G02B 27/017 |
| 2019/0369752 A1 * | 12/2019 | Ikeda | ................... G02B 27/017 |

(Continued)

*Primary Examiner* — Chun-Nan Lin

(74) *Attorney, Agent, or Firm* — Fernando & Partners, LLP

(57) ABSTRACT

A method includes tracking, via a positional tracker, the paired peripheral input device in a first tracking mode. The method includes obtaining sensor data from the paired peripheral input device via a communication interface. The method includes determining that the paired peripheral input device satisfies a contact criterion based on the sensor data. The contact criterion is based on a contact between the paired peripheral input device and a physical object. The method includes, in response to determining that the paired peripheral input device satisfies the contact criterion, changing the positional tracker from the first tracking mode to a second tracking mode. Tracking in the second tracking mode is based in part on a depth that indicates a distance between the electronic device and the physical object.

20 Claims, 12 Drawing Sheets

(56) References Cited

U.S. PATENT DOCUMENTS

| | | | |
|---|---|---|---|
| 2019/0370926 A1* | 12/2019 | Hagland | H04N 21/226 |
| 2020/0249749 A1 | 8/2020 | Akman et al. | |
| 2021/0109609 A1* | 4/2021 | Holsen | G06F 1/3259 |

* cited by examiner

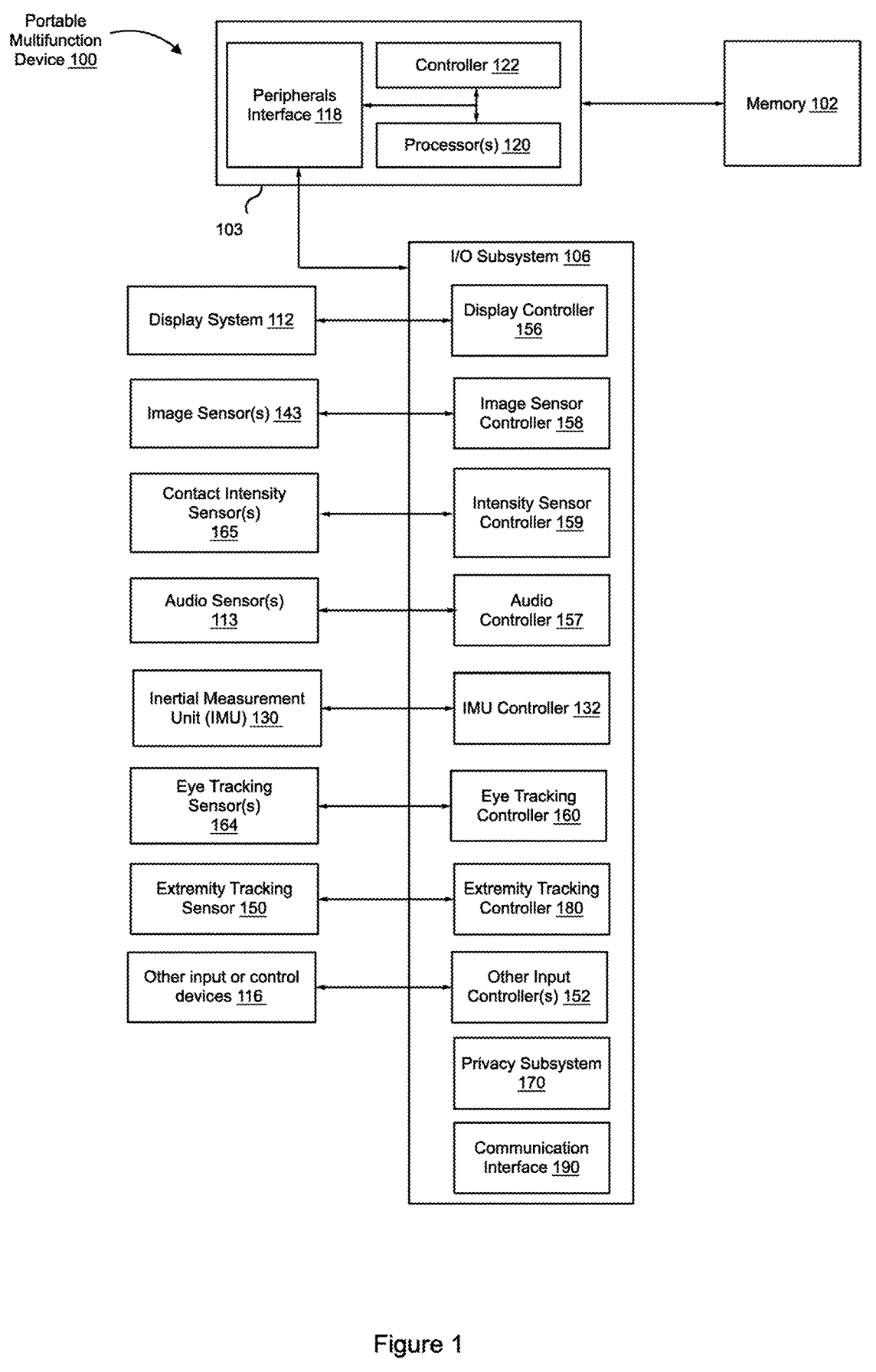

Portable Multifunction Device 100

Peripherals Interface 118

Controller 122

Processor(s) 120

Memory 102

103

I/O Subsystem 106

Display System 112

Display Controller 156

Image Sensor(s) 143

Image Sensor Controller 158

Contact Intensity Sensor(s) 165

Intensity Sensor Controller 159

Audio Sensor(s) 113

Audio Controller 157

Inertial Measurement Unit (IMU) 130

IMU Controller 132

Eye Tracking Sensor(s) 164

Eye Tracking Controller 160

Extremity Tracking Sensor 150

Extremity Tracking Controller 180

Other input or control devices 116

Other Input Controller(s) 152

Privacy Subsystem 170

Communication Interface 190

Figure 1

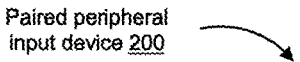

Paired peripheral
input device 200

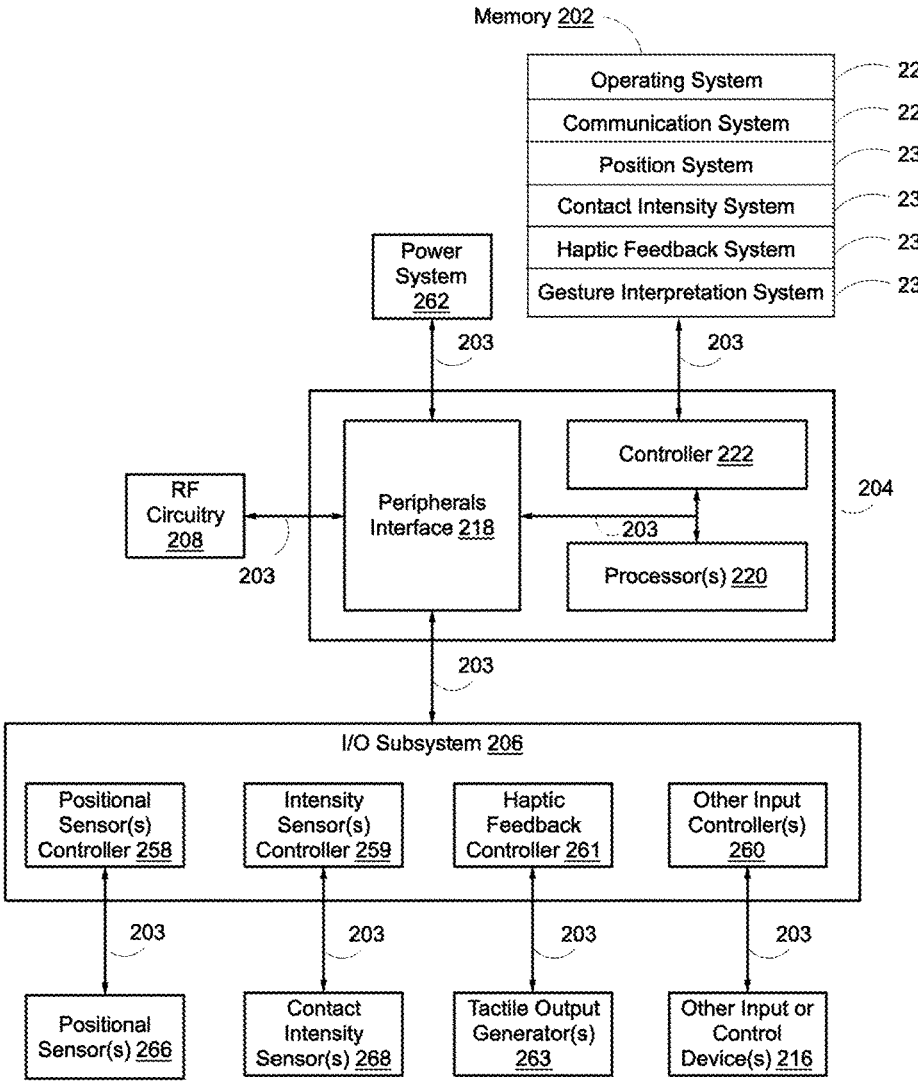

Memory 202

| Operating System | 226 |
| Communication System | 228 |
| Position System | 230 |
| Contact Intensity System | 232 |
| Haptic Feedback System | 234 |
| Gesture Interpretation System | 236 |

Power System 262

203                     203

Controller 222

203                     204

RF Circuitry 208

Peripherals Interface 218

Processor(s) 220

203

203

I/O Subsystem 206

| Positional Sensor(s) Controller 258 | Intensity Sensor(s) Controller 259 | Haptic Feedback Controller 261 | Other Input Controller(s) 260 |

203                203                203                203

| Positional Sensor(s) 266 | Contact Intensity Sensor(s) 268 | Tactile Output Generator(s) 263 | Other Input or Control Device(s) 216 |

TRACKING A PAIRED PERIPHERAL INPUT DEVICE BASED ON A CONTACT CRITERION

CROSS-REFERENCE TO RELATED APPLICATIONS

This application is a continuation of U.S. patent application Ser. No. 17/850,105, filed on Jun. 27, 2022, which claims priority to U.S. Provisional Patent App. No. 63/236, 154, filed on Aug. 23, 2021, and hereby incorporated by reference in its entirety.

TECHNICAL FIELD

The present disclosure relates to object tracking, and in particular, tracking a paired peripheral input device.

BACKGROUND

Tracking a paired input device is often inaccurate and computationally expensive. For example, determining a position of the paired input device within a three-dimensional (3D) physical environment using previously available techniques is associated with inaccuracies. For example, determining the depth of the paired input device within the 3D physical environment using computer vision alone is often associated with inaccuracies.

SUMMARY

In accordance with some implementations, a method is performed at an electronic device including one or more processors, a non-transitory memory, a positional tracker, and a communication interface provided to communicate with a paired peripheral input device. The method includes tracking, via the positional tracker, the paired peripheral input device in a first tracking mode. The method includes obtaining sensor data from the paired peripheral input device via the communication interface. The method includes determining that the paired peripheral input device satisfies a contact criterion based on the sensor data. The contact criterion is based on a contact between the paired peripheral input device and a physical object. The method includes, in response to determining that the paired peripheral input device satisfies the contact criterion, changing the positional tracker from the first tracking mode to a second tracking mode. Tracking the paired peripheral input device in the second tracking mode is based in part on a depth that indicates a distance between the electronic device and the physical object.

In accordance with some implementations, an electronic device includes one or more processors, a non-transitory memory, a positional tracker, and a communication interface provided to communicate with a paired peripheral input device. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIG. 1 is a block diagram of an example of a portable multifunction device in accordance with some implementations.

FIG. 2 is a block diagram of an example of a paired peripheral input device in accordance with some implementations.

DESCRIPTION OF IMPLEMENTATIONS

Figure 3A:
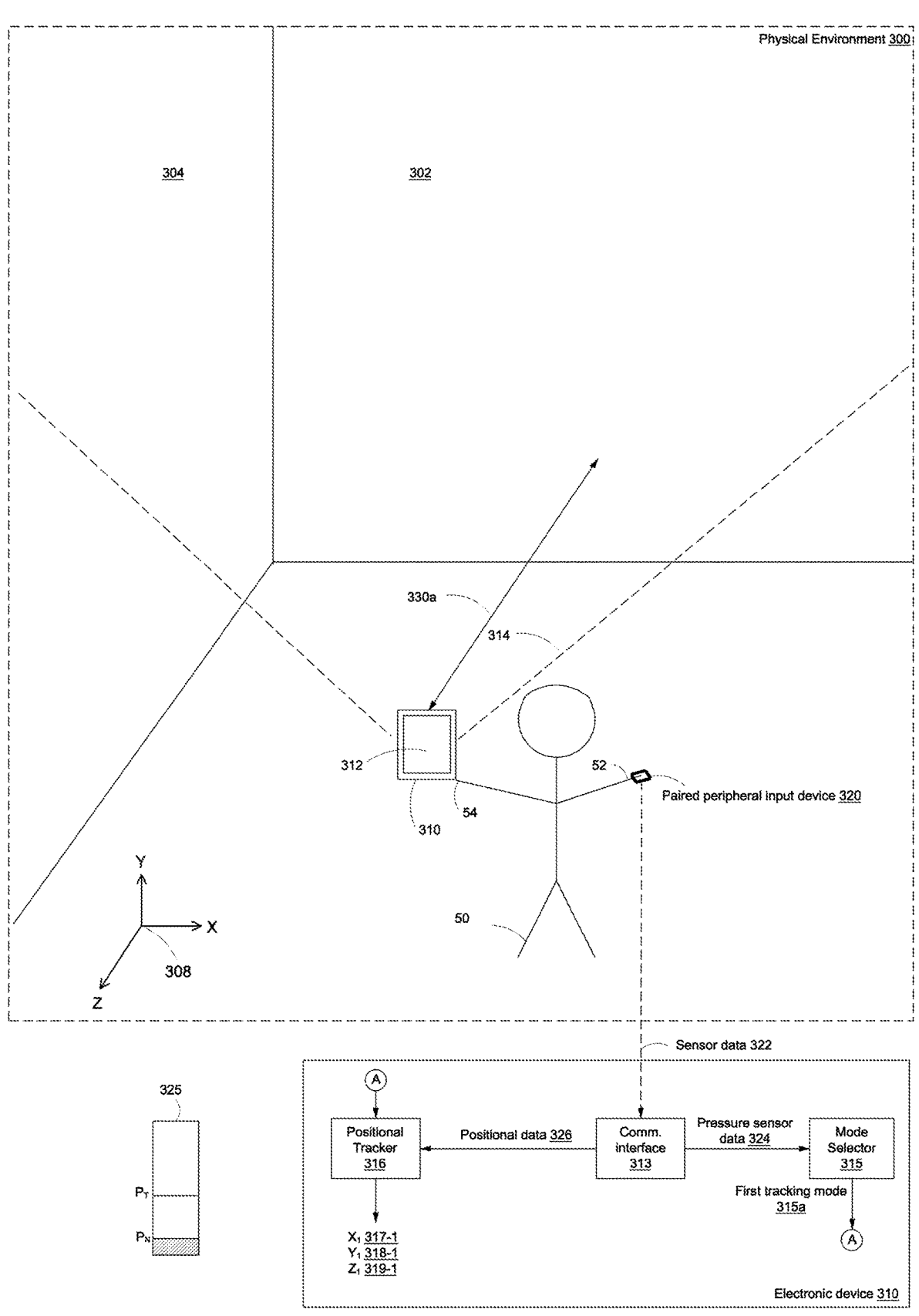
FIGS. 3A-3H are an example of an electronic device tracking a paired peripheral input device based on sensor data from the paired peripheral input device in accordance with some implementations.

Tracking a paired input device is often inaccurate and computationally expensive. Determining a position of the paired input device within a 3D physical environment is associated with inaccuracies. Tracking the depth of the paired input device within the 3D physical environment is particularly challenging. For example, using computer vision alone often leads to inaccurate depth values.

By contrast, various implementations disclosed herein include methods, electronic devices, and systems for more accurate tracking of a paired peripheral input device. To that end, an electronic device includes a positional tracker that tracks the paired peripheral input device according to different tracking modes. Based on sensor data from the paired peripheral input device, the electronic device changes the positional tracker from a first tracking to a second tracking mode. The sensor data may include a combination of pressure sensor data and proximity sensor data. The electronic device determines, based on the sensor data, that the paired peripheral input device satisfies a contact criterion associated with a physical object. For example, in some implementations, the electronic device determines that pressure sensor data exceeds a threshold pressure level, such as when a stylus contacts the physical object with adequate force. Based on satisfaction of the contact criterion, the electronic device changes the positional tracker from a first tracking mode to a second tracking mode.

In some implementations, in the first tracking mode the positional tracker performs six DOF tracking of the paired peripheral input device, whereas in the second tracking mode the positional tracker performs five DOF tracking of the paired peripheral input device based on a depth. The depth indicates a distance between the electronic device and a physical object. For example, before tracking the paired peripheral input device in the first tracking mode, the electronic device obtains an environmental map of at least a portion of a physical environment. The environmental map provides 3D information regarding the portion of the physical environment. Moreover, the electronic device extracts the depth from the environmental map, and the positional tracker uses the depth during tracking in the second tracking mode. For example, while in the second tracking mode, rather than determining the z positional value of the paired peripheral input device (as is done in the first tracking mode), the positional tracker assigns the depth to the z positional value. Using the depth indicated within the environmental map depth for z-tracking is advantageous, because the environmental map characterizes the location (e.g., the depth) of the physical object more accurately than using pure computer vision to locate the physical object.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Various examples of electronic systems and techniques for using such systems in relation to various computer-generated reality technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, a privacy subsystem 170, and a communication interface 190. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, paired peripheral input device, and/or a pointer device such as a mouse. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may include a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a paired peripheral input device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a paired peripheral input device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The inertial measurement unit (IMU) 130 includes accelerometers, gyroscopes, and/or magnetometers in order to measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect an eye gaze of a user of the electronic device 100 and generate eye tracking data indicative of the eye gaze of the user. In various implementations, the eye tracking data includes data indicative of a fixation point (e.g., point of regard) of the user on a display panel, a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

The electronic device 100 includes a communication interface 190 that is provided to communicate with a paired peripheral input device, such as the paired peripheral input device 200 in FIG. 2 or the paired peripheral input device 320 in FIGS. 3A-3H and 4. For example, the communication interface 190 corresponds to one of a BLUETOOTH interface, IEEE 802.11x interface, near field communication (NFC) interface, and/or the like. According to various implementations, the electronic device 100 obtains sensor data from the paired peripheral input device via the communication interface 190, and processes the sensor data, as will be further described below.

FIG. 2 is a block diagram of an example of a paired peripheral input device 200. Examples of the paired peripheral input device 200 include a stylus, a control device, a finger-wearable device, etc. The paired peripheral input device 200 includes memory 202 (which optionally includes one or more computer readable storage mediums), a memory controller 222, one or more processing units (CPUs) 220, a peripherals interface 218, RF circuitry 208, and an input/output (I/O) subsystem 206. These components optionally communicate over one or more communication buses or signal lines 203. One of ordinary skill in the art will appreciate that the paired peripheral input device 200 illustrated in FIG. 2 is one example of a paired peripheral input device, and that the paired peripheral input device 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

The paired peripheral input device 200 includes a power system 262 for powering the various components. The power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 202 optionally includes high-speed random-access memory and optionally also includes non-volatile memory, such as one or more flash memory devices, or other non-volatile solid-state memory devices. Access to memory 202 by other components of the paired peripheral input device 200, such as CPU(s) 220 and the peripherals interface 218, is, optionally, controlled by a memory controller 222.

The peripherals interface 218 can be used to couple input and output peripherals of the paired peripheral input device 200 to the CPU(s) 220 and the memory 202. The one or more processors 220 run or execute various software programs and/or sets of instructions stored in memory 202 to perform various functions for the paired peripheral input device 200 and to process data.

In some implementations, the peripherals interface 218, the CPU(s) 220, and the memory controller 222 are, optionally, implemented on a single chip, such as chip 204. In some implementations, they are implemented on separate chips.

The RF (radio frequency) circuitry 208 receives and sends RF signals, also called electromagnetic signals. The RF circuitry 208 converts electrical signals to/from electromagnetic signals and communicates with the electronic device 100 or 310, communications networks, and/or other communications devices via the electromagnetic signals. The RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 206 couples input/output peripherals on the paired peripheral input device 200, such as other input or control devices 216, with the peripherals interface 218. The I/O subsystem 206 optionally includes one or more positional sensor controllers 258, one or more intensity sensor controllers 259, a haptic feedback controller 261, and one or more other input controllers 260 for other input or control devices. The one or more other input controllers 260 receive/send electrical signals from/to other input or control devices 216. The other input or control devices 216 optionally include physical buttons (e.g., push buttons, rocker buttons, etc.), dials, slider switches, click wheels, and so forth. In some implementations, the other input controller(s) 260 are, optionally, coupled with any (or none) of the following: an infrared port and/or a USB port.

In some implementations, the paired peripheral input device 200 includes one or more positional sensors 266 that output positional data associated with the paired peripheral input device 200. The positional data is indicative of a position, orientation, or movement of the paired peripheral input device 200, such as a rotational movement or translational movement of the paired peripheral input device 200. For example, the positional sensor(s) 266 include an inertial measurement unit (IMU) that provides 3D rotational data, such as roll, pitch, and yaw information. To that end, the IMU may include a combination of an accelerometer, gyroscopes, and magnetometers. As another example, the positional sensor(s) 266 include a magnetic sensor that provides 3D positional data, such as the position of the paired peripheral input device 200. For example, the magnetic sensor measures weak magnetic fields in order to determine a position and/or orientation of the paired peripheral input device 200.

In some implementations, the paired peripheral input device 200 includes one or more contact intensity sensors 268 for detecting intensity (e.g., pressure) of a contact of the paired peripheral input device 200 against a physical object. The one or more contact intensity sensors 268 output pressure sensor data associated with the paired peripheral input device 200. As one example, the pressure sensor data is indicative of the pressure level associated with pressing the paired peripheral input device 200 on a surface of a physical table. The one or more contact intensity sensors 268 may include an interferometer. The one or more contact intensity sensors 268 may include one or more piezoresistive strain gauges, capacitive force sensors, electric force sensors, piezoelectric force sensors, optical force sensors, capacitive touch-sensitive surfaces, or other intensity sensors. In some implementations, the paired peripheral input device 200 corresponds to a stylus, and the contact intensity sensor(s) 268 are integrated in the tip of the stylus.

In some implementations, the paired peripheral input device 200 includes a proximity sensor. The proximity sensor generates a proximity value that provides information regarding the proximity of the paired peripheral input device 200 to a physical object. In some implementations, the proximity value indicates a distance between the paired peripheral input device 200 and a physical object. For example, when the paired peripheral input device 200 corresponds to a mouse resting on a surface of a physical table, the proximity value indicates a nominal distance. Moreover, as a user lifts the mouse off the surface, the proximity value changes in order to indicate an increasing distance.

The paired peripheral input device 200 optionally includes one or more tactile output generators 263 for generating tactile outputs on the paired peripheral input device 200. In some implementations, the term "tactile output" refers to physical displacement of an accessory (e.g., the paired peripheral input device 200) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the paired peripheral input device 200) is, optionally, interpreted by the user as a "click" of a physical actuator button. In some cases, a user will feel a tactile sensation such as a "click" even when there is no movement of a physical actuator button associated with the paired peripheral input device that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 2 shows the tactile output generator(s) 263 coupled with a haptic feedback controller 261. The tactile output generator(s) 263 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 263 receive tactile feedback generation instructions from a haptic feedback system 234 and generates tactile outputs on the paired peripheral input device 200 that are capable of being sensed by a user of the paired peripheral input device 200.

In some implementations, the software components stored in the memory 202 include an operating system 226, a communication system (or set of instructions) 228, a position system (or set of instructions) 230, a contact intensity system (or set of instructions) 232, a haptic feedback system (or set of instructions) 234, and a gesture interpretation system (or set of instructions) 236. Furthermore, in some implementations, the memory 202 stores a device/global internal state associated with the paired peripheral input device. The device/global internal state includes one or more of: sensor state, including information obtained from the paired peripheral input device's various sensors and other input or control devices 216; positional state, including information regarding the paired peripheral input device's position (e.g., position, orientation, tilt, roll and/or distance) relative to an electronic device (e.g., the electronic device 100); and location information concerning the paired peripheral input device's absolute position.

The operating system 226 includes various software components and/or drivers for controlling and managing general system tasks (e.g., memory management, power management, etc.) and facilitates communication between various hardware and software components.

The communication system 228 facilitates communication with other devices (e.g., the electronic device 100 or the electronic device 310), and also includes various software components (e.g., for handling data received by the RF circuitry 208) that are adapted for coupling directly to other devices or indirectly over a network (e.g., the Internet, wireless LAN, etc.).

The position system 230, in conjunction with positional data from the one or more positional sensor(s) 266, optionally detects positional information concerning the paired peripheral input device 200. The position system 230 optionally includes software components for performing various operations related to detecting the position of the paired peripheral input device 200 and detecting changes to the position of the paired peripheral input device 200 in a particular frame of reference. In some implementations, the position system 230 detects the positional state of the paired peripheral input device 200 relative to the electronic device and detects changes to the positional state of the paired peripheral input device 200 relative to the electronic device. As noted above, in some implementations, the electronic device 100 or 310 determines the positional state of the paired peripheral input device 200 relative to the electronic device and changes to the positional state of the paired peripheral input device 200 using information from the position system 230.

The contact intensity system 232, in conjunction with pressure sensor data from the one or more contact intensity sensor(s) 268, optionally detects contact intensity information associated with the paired peripheral input device 200. The contact intensity system 232 includes software components for performing various operations related to detection of contact, such as detecting the intensity and/or duration of a contact between the paired peripheral input device 200 and a desk surface. Determining movement of the point of contact, which is represented by a series of pressure sensor data, optionally includes determining speed (magnitude), velocity (magnitude and direction), and/or an acceleration (a change in magnitude and/or direction) of the point of contact.

The haptic feedback system 234 includes various software components for generating instructions used by the tactile output generator(s) 263 to produce tactile outputs at one or more locations on the paired peripheral input device 200 in response to user interactions with the paired peripheral input device 200.

The paired peripheral input device 200 optionally includes a gesture interpretation system 236. The gesture interpretation system 236 coordinates with the position system 230 and/or the contact intensity system 232 in order to determine a gesture performed by the paired peripheral input device. For example, the gesture includes one or more of: a pinch gesture, a pull gesture, a pinch and pull gesture, a rotational gesture, a tap gesture, and/or the like. In some implementations, the paired peripheral input device 200 does not include a gesture interpretation system, and an electronic device or a system determines a gesture performed by the paired peripheral input device 200 based on sensor data from the paired peripheral input device 200. In some implementations, a portion of the gesture determination is performed at the paired peripheral input device 200, and a portion of the gesture determination is performed at an electronic device/system. In some implementations, the gesture interpretation system 236 determines a time duration associated with a gesture. In some implementations, the gesture interpretation system 236 determines a contact intensity associated with a gesture, such as an amount of pressure associated with the paired peripheral input device 200.

Each of the above identified modules and applications correspond to a set of executable instructions for performing one or more functions described above and the methods described in this application (e.g., the computer-implemented methods and other information processing methods described herein). These systems (i.e., sets of instructions) need not be implemented as separate software programs, procedures or modules, and thus various subsets of these modules are, optionally, combined or otherwise re-arranged in various embodiments. In some implementations, the memory 202 optionally stores a subset of the systems and data structures identified above. Furthermore, the memory 202 optionally stores additional systems and data structures not described above.

FIGS. 3A-3H are an example of an electronic device tracking a paired peripheral input device based on sensor data from the paired peripheral input device in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As illustrated in FIG. 3A, a physical environment 300 includes a first physical wall 302 and a second physical wall 304. The physical environment 300 is characterized by a reference coordinate system 308, corresponding to a 3D cartesian coordinate system. The first physical wall 302 is parallel to the x axis of the reference coordinate system 308, and is positioned at a particular z value within the physical environment 300. The second physical wall 304 is parallel to the z axis of the reference coordinate system 308, and is positioned at a particular x value within the physical environment 300. One of ordinary skill in the art will appreciate that the reference coordinate system 308 can define in the physical environment 300 in any manner of ways, and may correspond to another type of coordinate system (e.g., polar coordinate system, cylindrical coordinate system, etc.).

The physical environment 300 further includes a user 50. For example, the physical environment 300 corresponds to a bedroom that includes the user 50. A first hand 52 of the user 50 is holding a paired peripheral input device 320, and a second hand 54 of the user 50 is holding an electronic device 310. The paired peripheral input device 320 is paired to the electronic device 310, enabling a communication interface 313 of the electronic device 310 to obtain sensor data 322 from the paired peripheral input device 320. For example, the communication interface 313 is similar to and adapted from the communication interface 190 illustrated in FIG. 1. One of ordinary skill in the art will appreciate that the electronic device 310 may communicate with the paired peripheral input device 320 according to a variety of communication protocols, such as BLUETOOTH, IEEE 802.11x, NFC, etc. In some implementations, the sensor data 322 includes a combination of positional data 326 (e.g., output by positional sensor(s) of the paired peripheral input device 320) and pressure sensor data 324 (e.g., output by contact intensity sensor(s) of the paired peripheral input device 320). In some implementations, in addition to or instead of including the pressure sensor data 324, the sensor data 322 includes other types of sensor data, such as proximity sensor data output from a proximity sensor integrated in the paired peripheral input device 320. In some implementations, the electronic device 310 corresponds to a mobile device, such as a smartphone, tablet, wearable device, and/or the like. In some implementations, the electronic device 310 corresponds to a head-mountable device (HMD). In some implementations, the electronic device 310 generates one of the XR settings described above.

The electronic device 310 may include a display 312 that is associated with a viewable region 314 of the physical environment 300. For example, in some implementations, the electronic device 310 includes an image sensor that approximately captures the viewable region 314, and the electronic device 310 composites pass-through image data from the image sensor with computer-generated (e.g., XR) content in order to generate display data to be displayed on the display 312. As another example, in some implementations, the electronic device 310 includes a see-through display 312 that enables ambient light to enter from a portion of the physical environment 300 that is associated with the viewable region 314.

The electronic device 310 further includes a mode selector 315 and a positional tracker 316 that together facilitate tracking of the paired peripheral input device 320. Although the mode selector 315 and a positional tracker 316 are illustrated as separate components, one of ordinary skill in the art will appreciate that, in some implementations, a single component implements both functions. The positional tracker 316 tracks the paired peripheral input device 320 in a particular tracking mode. For example, in a first tracking mode, the positional tracker 316 performs six degrees of freedom (DOF) tracking of the paired peripheral input device 320. As another example, in a second tracking mode, the positional tracker 316 performs five DOF tracking of the paired peripheral input device 320. For example, while in the second tracking mode, rather than determining a z positional value of the paired peripheral input device 320, the electronic device 310 assigns a depth, indicated within an environmental map, to the z positional value. The depth indicates a distance between the electronic device 310 and a physical object. In some implementations, the positional tracker 316 tracks the paired peripheral input device 320 based at least in part on positional data 326 from the paired peripheral input device 320. For example, the positional data

326 includes IMU data (e.g., 3D rotational data) from an IMU integrated in the paired peripheral input device 320. In some implementations, the positional tracker 316 tracks the paired peripheral input device 320 at least in part by performing a computer vision technique, optionally with the aid of a neural network. For example, in order to identify the paired peripheral input device 320 within image data from an image sensor, the positional tracker 316 performs instance segmentation or semantic segmentation with respect to the image data.

As illustrated in FIG. 3A, a first depth 330a indicates a distance between the electronic device 310 and the first physical wall 302. To that end, in some implementations, the electronic device 310 stores an environmental map of at least a portion of the physical environment 300, and obtains the first depth 330a by extracting the first depth 330a from the stored environmental map. The environmental map may correspond to a 3D map, such as a simultaneous localization and mapping (SLAM) map. In some implementations, the electronic device 310 obtains the environmental map before tracking the paired peripheral input device 320 in any tracking mode.

The mode selector 315 sets the tracking mode of the positional tracker 316 based on the pressure sensor data 324 from the paired peripheral input device 320. For example, with reference to FIG. 2, the contact intensity sensor(s) 268 of the paired peripheral input device 200 provides pressure sensor data to the electronic device 310. Referring back to FIG. 3A, because the paired peripheral input device 320 is not contacting a physical object, the pressure sensor data 324 indicates a nominal pressure level $(P_N)$, as indicated within a pressure indicator 325. Because the nominal pressure level $(P_N)$ is less than a threshold pressure level $(P_T)$, the mode selector 315 determines that the paired peripheral input device 320 does not satisfy a contact criterion. The contact criterion is based on a contact between the paired peripheral input device 320 and a physical object. Accordingly, the mode selector 315 places the positional tracker 316 in a first tracking mode 315a. One of ordinary skill in the art will appreciate, that in some implementations, the mode selector 315 sets the tracking mode of the positional tracker 316 based on other types of sensor data 322 from the paired peripheral input device 320, such as proximity sensor data.

The first tracking mode 315a may be associated with six DOF tracking of the paired peripheral input device 320, including three-dimensional positional tracking (XYZ) plus three-dimensional orientation tracking (e.g., roll, pitch, and yaw). For example, the positional tracker 316 performs computer vision with respect to the paired peripheral input device 320 in order to track the positional tracker 316 with six DOF. Accordingly, as part of the six DOF tracking, the positional tracker 316 determines three positional values (XYZ) respectively associated with three dimensions. The three positional values correspond to $X_1$ 317-1, $Y_1$ 318-1, and $Z_1$ 319-1, as illustrated in FIG. 3A. $X_1$ corresponds to a x position of the paired peripheral input device 320 within the physical environment 300. $Y_1$ corresponds to a y position of the paired peripheral input device 320 within the physical environment 300. $Z_1$ corresponds to a z position of the paired peripheral input device 320 within the physical environment 300. The three positional values collectively indicate a particular 3D position of the paired peripheral input device 320 within the physical environment 300. In other words, the three positional values collectively indicate a particular point of the reference coordinate system 308.

Figure 3B:
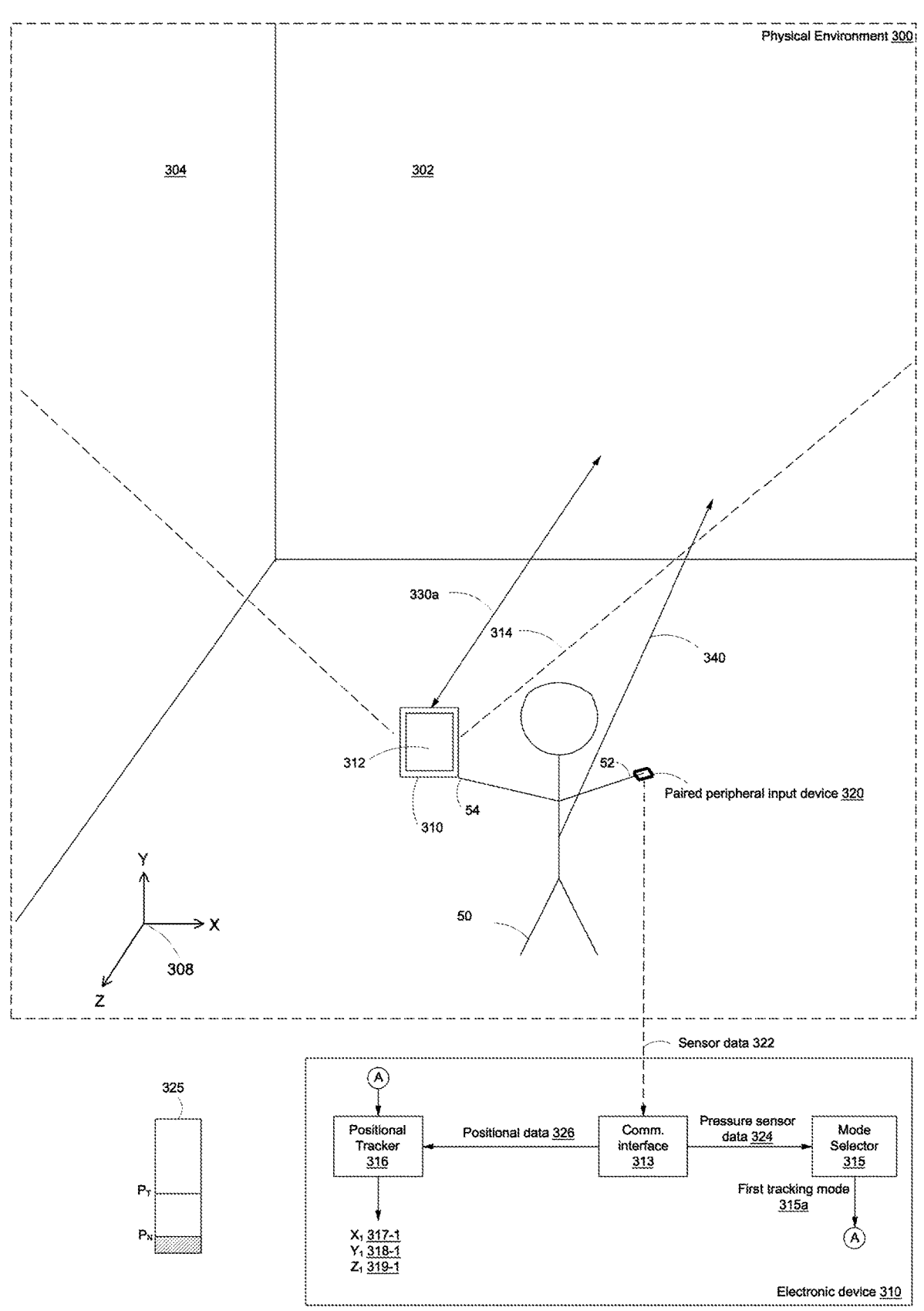
Figure 3C:
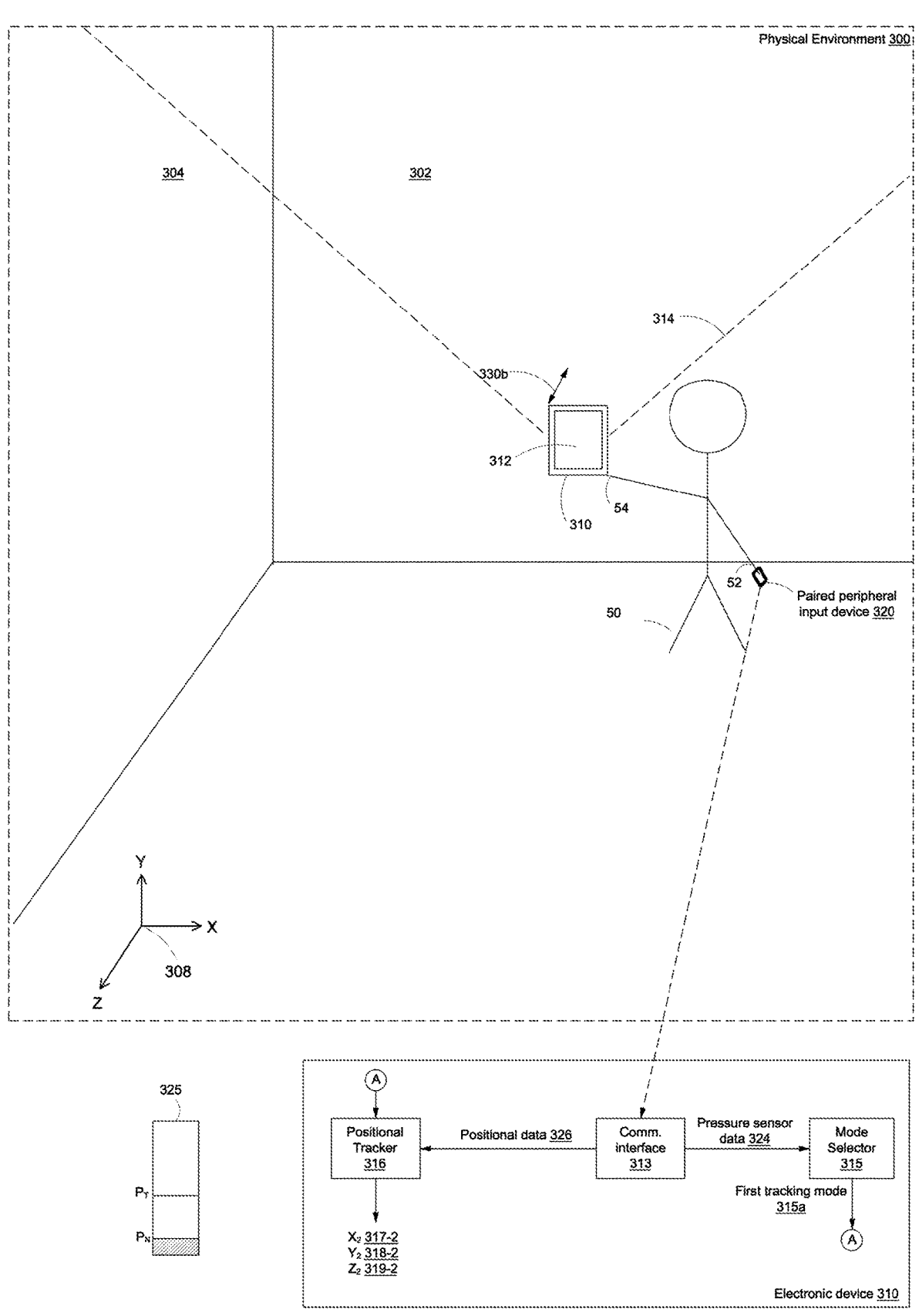

As illustrated in FIG. 3B, the user 50 begins walking towards the first physical wall 302, as indicated by movement line 340. As illustrated in FIG. 3C, the user 50 completes walking. Accordingly, the electronic device 310 obtains, from the environmental map, a second depth 330*b* that indicates the distance between the electronic device 310 and the first physical wall 302. The second depth 330*b* is less than the first depth 330*a*. Notably, the paired peripheral input device 320 is still not pressing against a physical object, and thus the pressure indicator 325 indicates that the pressure sensor data 324 corresponds to the nominal pressure level ($P_N$). Accordingly, the mode selector 315 maintains the paired peripheral input device 320 in the first tracking mode 315*a* because the paired peripheral input device 320 does not satisfy the contact criterion. Moreover, based on the updated position of the paired peripheral input device 320, the positional tracker 316 determines three updated positional values, $X_2$ 317-2, $Y_2$ 318-2, and $Z_2$ 319-2.

Figure 3D:
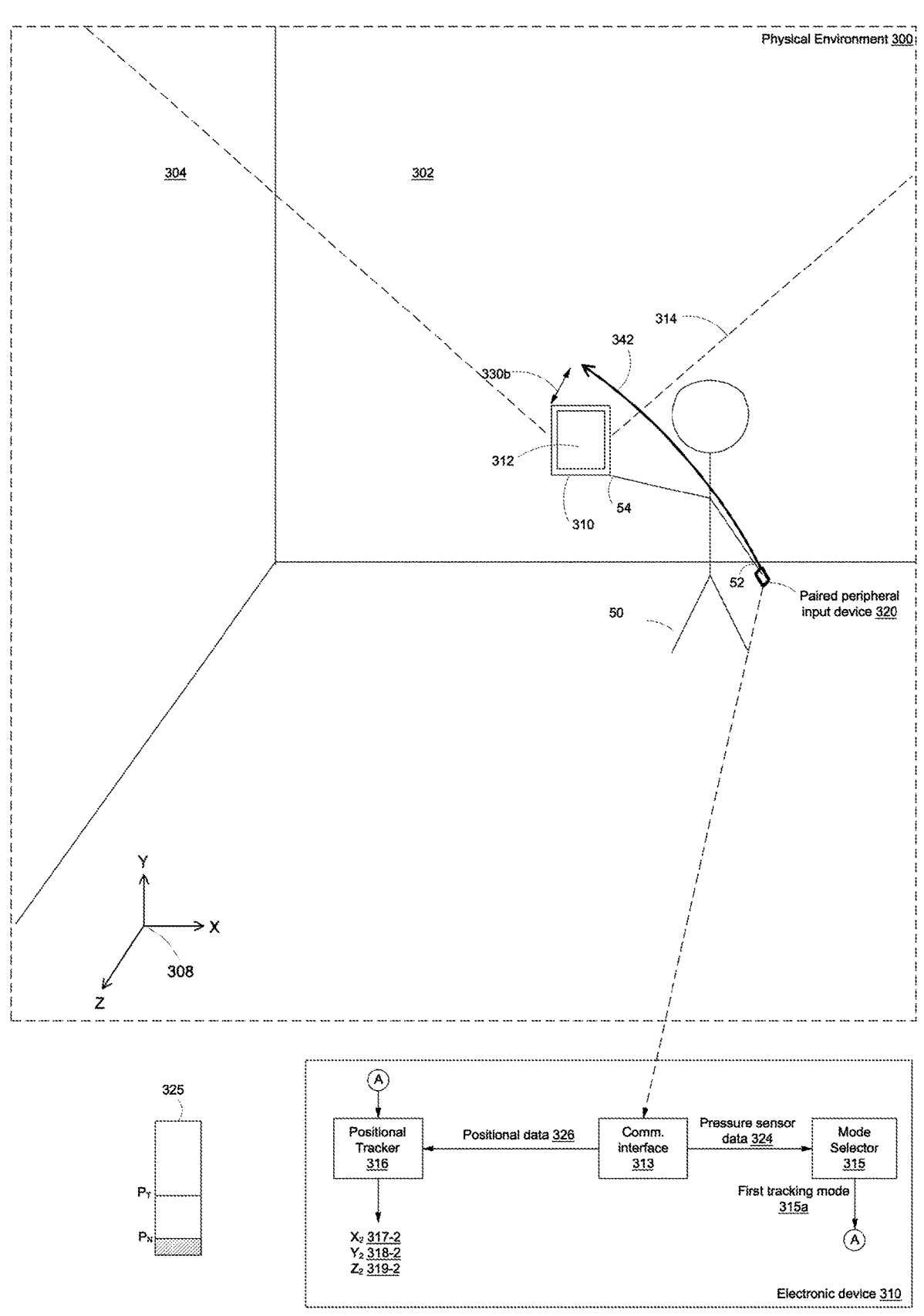
Figure 3E:
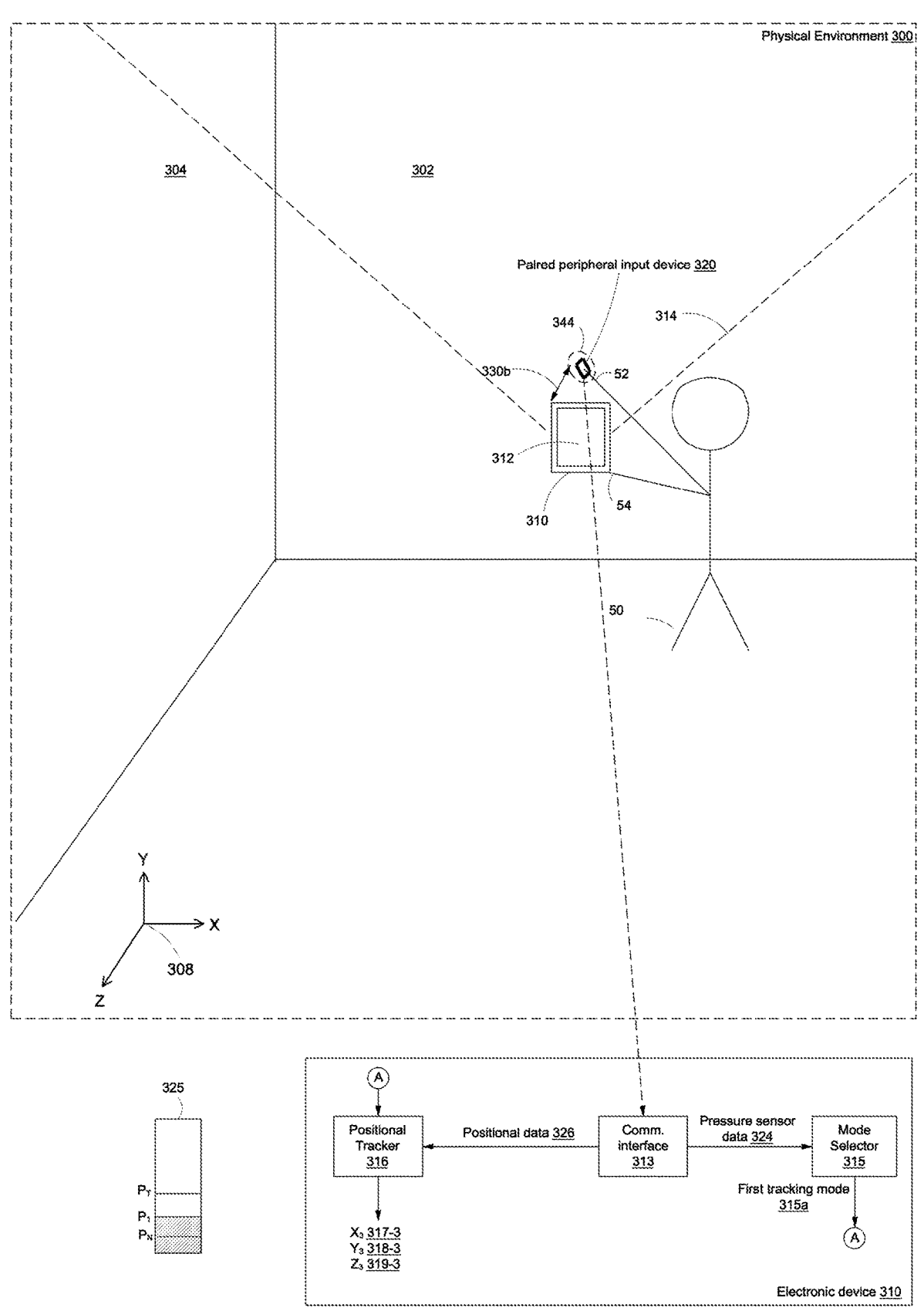

As illustrated in FIG. 3D, the user 50 begins to move the paired peripheral input device 320 towards the first physical wall 302, as indicated by movement line 342. As illustrated in FIG. 3E, the paired peripheral input device 320 initially contacts the first physical wall 302, as is indicated by a first contact indicator 344. Based on the initial contact, the paired peripheral input device 320 outputs pressure sensor data 324 that indicates a first pressure level ($P_1$). The first pressure level ($P_1$) is greater than the nominal pressure level ($P_N$), but less than the threshold pressure level ($P_T$), as indicated by the pressure indicator 325. Accordingly, the mode selector 315 determines that the paired peripheral input device 320 does not satisfy the contact criterion, and thus maintains the positional tracker 316 in the first tracking mode 315*a*. Based on the updated position of the paired peripheral input device 320, the positional tracker 316 determines three updated positional values, $X_3$ 317-3, $Y_3$ 318-3, and $Z_3$ 319-3.

Figure 3F:
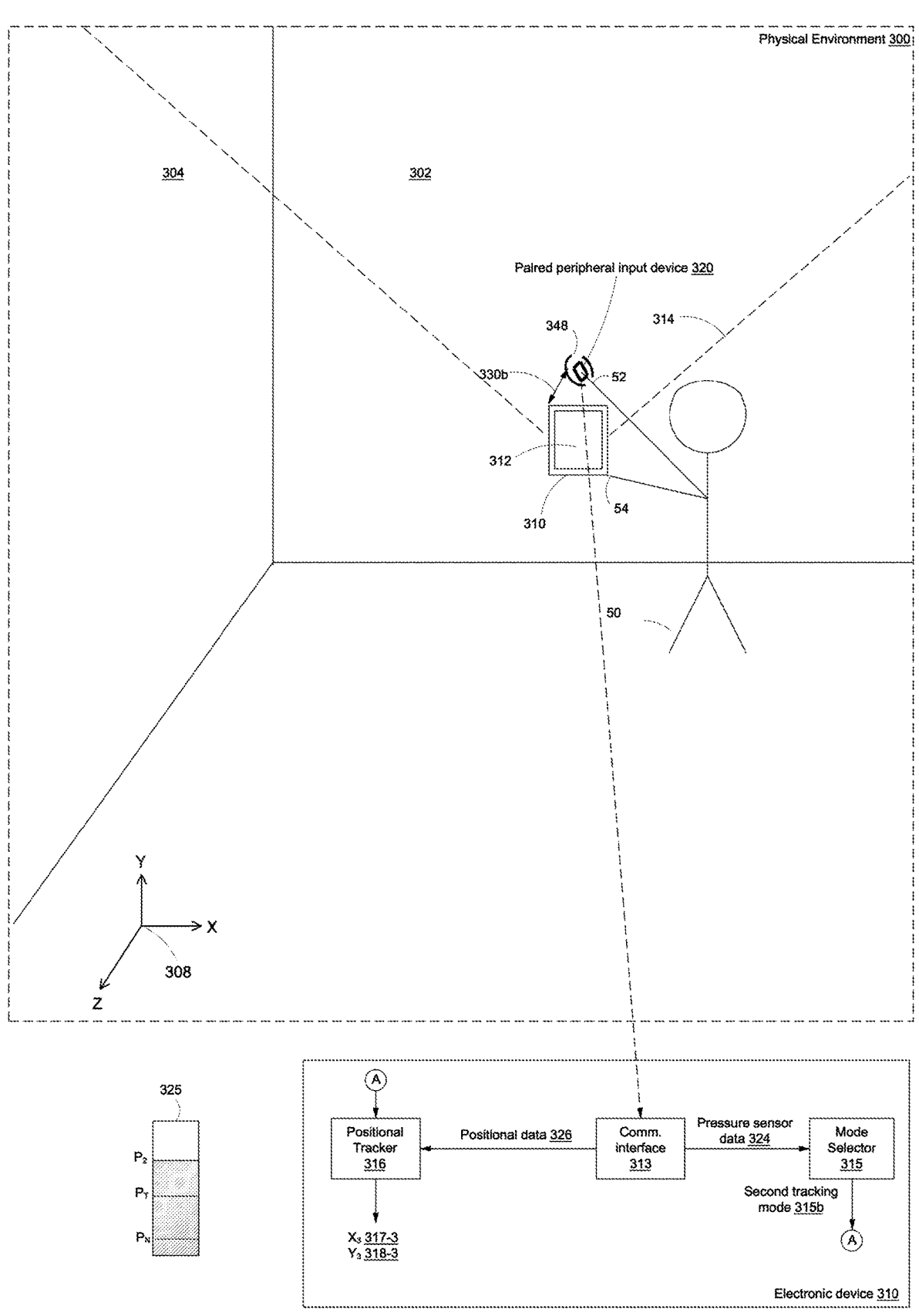

As illustrated in FIG. 3F, the paired peripheral input device 320 contacts the first physical wall 302 with a second pressure level ($P_2$), as is indicated by a second contact indicator 348. The second pressure level ($P_2$) is greater than the threshold pressure level ($P_T$), as indicated by the pressure indicator 325. Accordingly, the mode selector 315 determines that the paired peripheral input device 320 satisfies the contact criterion.

Based on determining that the paired peripheral input device 320 satisfies the contact criterion, the mode selector 315 changes the positional tracker 316 from the first tracking mode 315*a* to a second tracking mode 315*b*. The second tracking mode 315*b* may be associated with five DOF tracking, rather than the six DOF tracking associated with the first tracking mode 315*a*. For example, while in the second tracking mode 315*b*, the positional tracker 316 foregoes determining a z positional value (e.g., via a computer vision technique) associated with the paired peripheral input device 320, and instead uses the second depth 330*b* as the z value associated with the paired peripheral input device 320. In other words, while the paired peripheral input device 320 contacts the first physical wall 302, the positional tracker 316 assumes the paired peripheral input device 320 has a relatively constant z value, which corresponds to the z value (the second depth 330*b*) of the first physical wall 302. To that end, in some implementations, based on determining that the paired peripheral input device 320 satisfies the contact criterion, the electronic device 310 identifies the first physical wall 302 as proximate to the paired peripheral input device 320, such as via a computer vision technique. Moreover, the electronic device 310 extracts the second depth 330*b* from a portion of environmental map corresponding to the identified first physical wall 302.

Using the second depth 330*b* for tracking the paired peripheral input device 320 is associated with more accurate tracking, as compared with other techniques. For example, performing pure computer vision in order to determine depth information regarding the paired peripheral input device 320 is often inaccurate. By contrast, an environmental map, which indicates depths (e.g., the second depth 330*b*) associated with various physical objects, provides more accurate positional information regarding a physical environment.

Figure 3G:
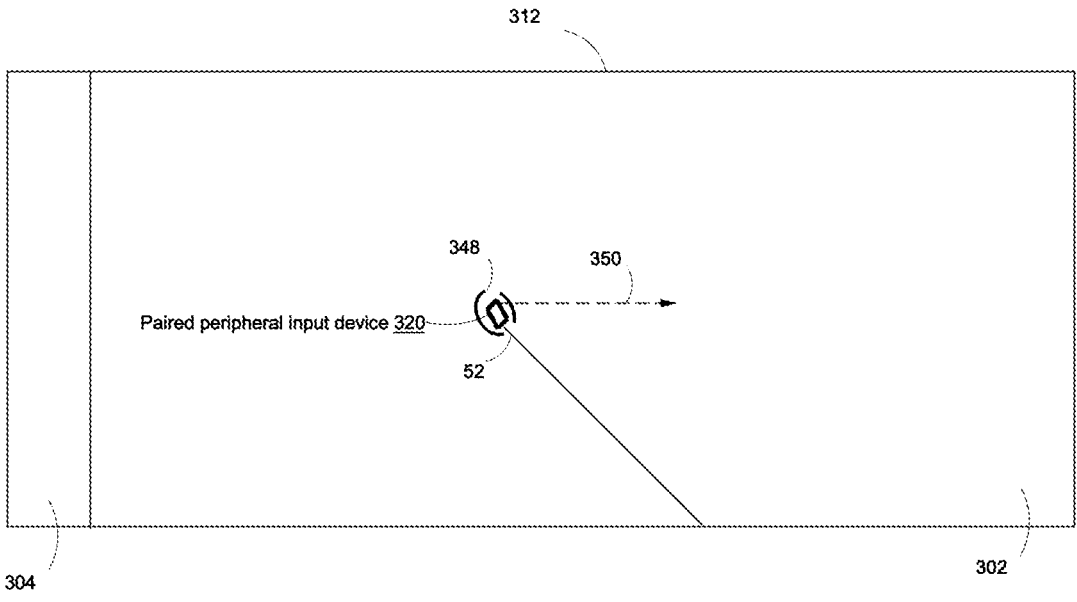
Figure 3H:
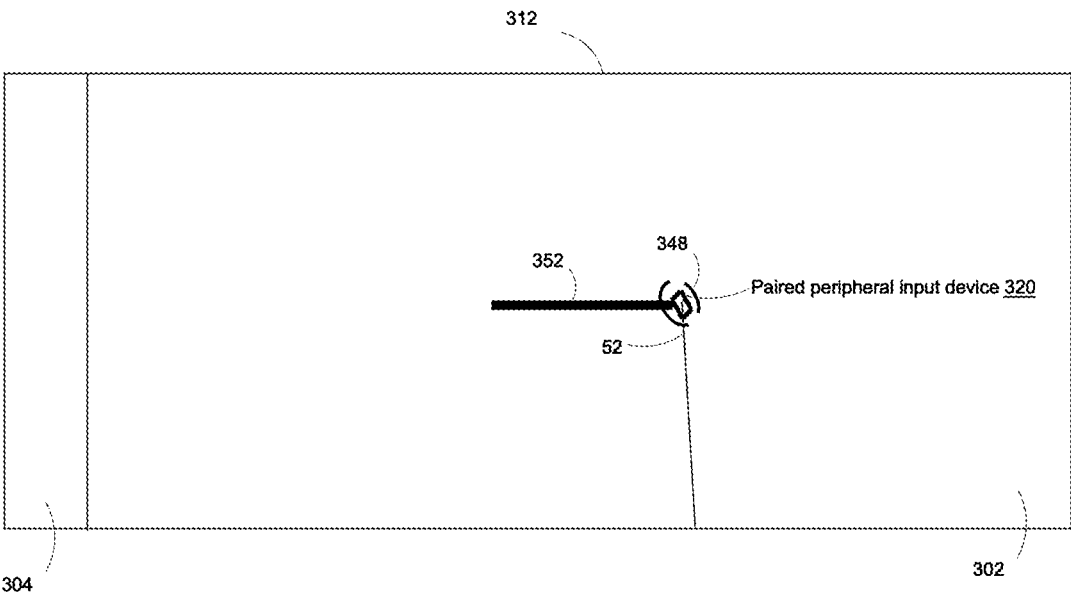

As illustrated in FIGS. 3G and 3H, the electronic device 310 performs a drawing operation while tracking the paired peripheral input device 320 in the second tracking mode 315*b*. As illustrated in FIG. 3G, the paired peripheral input device 320 moves rightwards along the first physical wall 302, as indicated by a drawing line 350 (illustrated for purely explanatory purposes). As the paired peripheral input device 320 moves rightwards, the paired peripheral input device 320 continues to contact the first physical wall 302 with the second pressure level ($P_2$), as is indicated by the second contact indicator 348 (illustrated for purely explanatory purposes). Accordingly, while moving rightwards, the paired peripheral input device 320 outputs pressure sensor data 324 that satisfies the pressure threshold. The positional tracker 316, therefore, continues performing five DOF tracking on the paired peripheral input device 320 during the rightwards movement. One of ordinary skill in the art will appreciate that the level of pressure between the paired peripheral input device 320 and a particular physical object need not stay constant (e.g., at the second pressure level ($P_2$)) for the positional tracker 316 to continue to perform five DOF tracking. As long as the pressure sensor data 324 satisfies the pressure threshold, tracking the paired peripheral input device 320 in the five DOF mode is appropriate.

Based on the five DOF tracking of the paired peripheral input device 320 during the rightwards movement, the electronic device 310 performs a corresponding drawing operation. Namely, as illustrated in FIG. 3H, the electronic device 310 displays, on the display 312, a drawing mark 352 that is overlaid on a portion of the first physical wall 302, based on the rightwards movement.

According to various implementations, a plurality of physical objects are within the viewable region 314, and the electronic device 310 selects a particular physical object, of the plurality of physical objects, on which to perform a subsequent drawing operation. To that end, in some implementations, the electronic device 310 selects the particular physical object based on a combination of five DOF depth information (obtained while the paired peripheral input device 320 is in five DOF mode) and six DOF depth information (obtained while the paired peripheral input device 320 is in six DOF mode). The five DOF depth information may include pressure sensor data indicating contact between the paired peripheral input device 320 and the particular physical object. The five DOF depth information may include proximity sensor data indicating less than a threshold distance between the paired peripheral input device 320 and the particular physical object. The six DOF depth information may include correspondences of z-distance measurements with a known surface profile of the particular physical object. The electronic device 310 may identify the surface profile based on an environmental map (e.g., SLAM map). For example, the electronic device 310 identifies that the z-distance measurements of the paired peripheral input device 320 approximately follows a curve that corresponds to the curvature of a coffee mug, as indicated in the environmental map.

Figure 4:
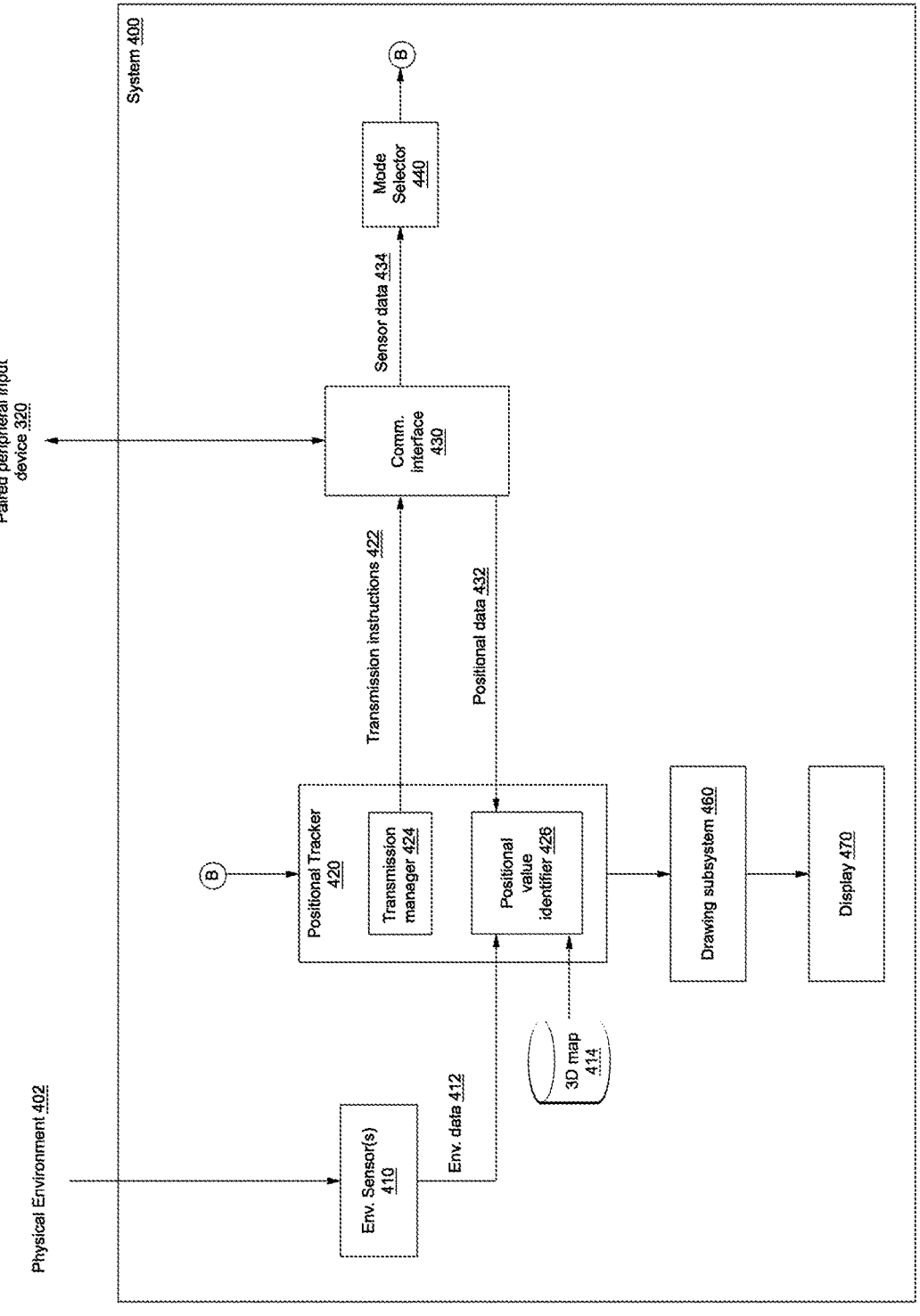
FIG. 4 is an example of a system for tracking a paired peripheral input device based on sensor data from the paired peripheral input device in accordance with some implementations.

FIG. 4 is an example of a system 400 for tracking a paired peripheral input device based on sensor data from the paired peripheral input device in accordance with some implementations. According to various implementations, the system 400 or portions thereof is integrated in an electronic device, such as the electronic device 310 illustrated in FIGS. 3A-3H.

The system 400 includes a communication interface 430 to obtain sensor data from the paired peripheral input device 320. In some implementations, the communication interface 430 is similar to and adapted from the communication interface 313 of the electronic device 310. The sensor data 434 is output from one or more sensors of the paired peripheral input device 320. The sensor data 434 may include pressure sensor data that characterizes a level of pressure associated with (e.g., exerted against) the paired peripheral input device 320. For example, the pressure sensor data is from a contact intensity sensor of the peripheral input device 320. The sensor data 434 may include proximity sensor data from a proximity sensor of the paired peripheral input device 320. The proximity sensor data indicates a proximity value that characterizes a distance between the paired peripheral input device 320 and a physical object. The sensor data may include positional data 432 that indicates positional information regarding the paired peripheral input device 320. For example, the positional data 432 is from an IMU of the peripheral input device 320.

The system 400 includes a positional tracker 420 that tracks the position of the paired peripheral input device 320 in a particular tracking mode. In some implementations, the positional tracker 420 is similar to and adapted from the positional tracker 316 described with reference to FIGS. 3A-3H. The system 400 includes a mode selector 440 that sets (e.g., changes or maintains) the tracking mode of the positional tracker 420 based on the sensor data 434. For example, the mode selector 440 determines whether or not pressure sensor data satisfies (e.g., exceeds) a pressure threshold. As another example, the mode selector 440 determines whether or not proximity sensor data indicates a distance value that is less than a threshold.

Based on the sensor data 434, the mode selector 440 determines whether or not the paired peripheral input device 320 satisfies a contact criterion associated with a physical object. For example, the mode selector 440 determines that the paired peripheral input device 320 does not satisfy the contact criterion based on the pressure sensor data indicating that the paired peripheral input device 320 does not contact a physical object with adequate force. As a counterexample, the mode selector 440 determines that the paired peripheral input device 320 satisfies the contact criterion based on the pressure sensor data indicating that the paired peripheral input device 320 contacts the physical object with adequate force.

Based on determining that the paired peripheral input device 320 does not satisfy the contact criterion, the mode selector 440 directs the positional tracker 420 to operate in a first tracking mode (e.g., six DOF tracking). On the other hand, based on determining that the paired peripheral input device 320 satisfies the contact criterion, the mode selector 440 directs the positional tracker 420 to operate in a second tracking mode (e.g., five DOF tracking).

The positional tracker 420 includes a positional value identifier 426 that determines various positional values of the paired peripheral input device 320. For example, while in the first tracking mode, the positional value identifier 426 determines six positional values associated with the paired peripheral input device 320, including a x positional value, y positional value, z positional value, and three rotational values (e.g., roll, pitch, and yaw). On other hand, while in the second tracking mode, the positional value identifier 426 foregoes determining the z positional value, and instead obtains a depth from a 3D map 414. To that end, the positional value identifier 426 may identify (e.g., via computer vision) the physical object that the paired peripheral input device 320 contacts, and extract the depth from the 3D map 414 that corresponds to the identified physical object.

In some implementations, the positional value identifier 426 applies a computer vision technique to environmental data 412 in order to determine the positional values. The environmental data 412 may be from a variety of environmental sensors 410, such an image sensor, depth sensor, etc. For example, the environmental data 412 includes image data of the physical environment 402 from the image sensor. As another example, the environmental data 412 includes depth sensor data associated with the physical environment 402 from the depth sensor. As one example, the positional value identifier 426 applies per-pixel instance segmentation with respect to image data in order to determine the positional values of the paired peripheral input device 320.

In some implementations, the positional value identifier 426 utilizes the positional data 432 in order to track the paired peripheral input device 320, enabling greater tracking accuracy. For example, the positional value identifier 426 uses IMU data from the paired peripheral input device 320 in order to more accurately track the paired peripheral input device 320.

In some implementations, while tracking in the second tracking mode, the positional tracker 420 directs the paired peripheral input device 320 to change the positional data 432 being transmitted. For example, the positional tracker 420 directs the paired peripheral input device 320 to cease transmitting 3D positional data, and instead transmit 2D positional data. To that end, the positional tracker 420 may include a transmission manager 424 that provides transmission instructions 422, via the communication interface 430, to the paired peripheral input device 320. Accordingly, the system 400 may reduce channel utilization by receiving, via the communication interface 430, 2D positional data that is smaller than 3D positional data.

In some implementations, the system 400 includes a drawing subsystem 460 that performs a drawing operation, based on the tracking of the paired peripheral input device 320. For example, the drawing subsystem 460 obtains positional values (e.g., positional values $X_3$ 317-3 and $Y_3$ 318-3 illustrated in FIG. 3F) from the positional tracker 420, and uses the positional values to drive a display 470. As one example, the positional tracker 420 tracks movement of the paired peripheral input device 320 from a first XY position to a second XY position, and based on the tracking the drawing subsystem 460 directs the display 470 to display a corresponding drawing mark that starts at the first XY position and ends at the second XY position.

Figure 5:
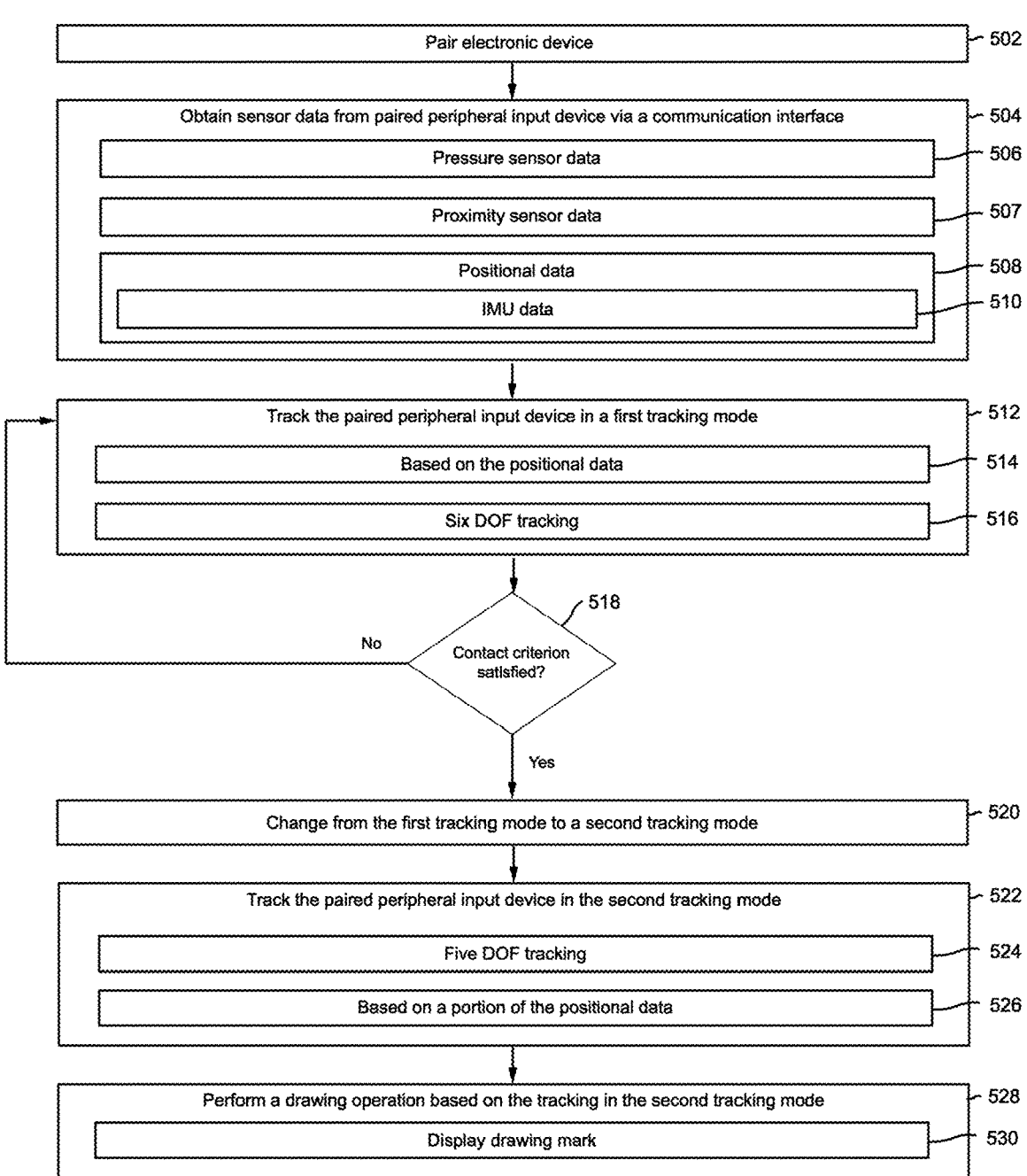
FIG. 5 is an example of a flow diagram of a method of tracking a paired peripheral input device based on sensor data from the paired peripheral input device in accordance with some implementations.

FIG. 5 is an example of a flow diagram of a method 500 of tracking a paired peripheral input device based on sensor data from the paired peripheral input device in accordance with some implementations. In various implementations, the method 500 or portions thereof are performed by an electronic device (e.g., the electronic device 100 in FIG. 1 or the electronic device 310 in FIGS. 3A-3H). In various implementations, the method 500 or portions thereof are performed by a head-mountable device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, in some implementations, the method 500 includes pairing an electronic device with a peripheral input device, resulting in a paired peripheral input device with respect to the electronic device. Pairing includes establishing a communication link, in order to enable a communication interface of the electronic device to obtain data from the paired peripheral input device. Pairing is sometimes referred to as tethering.

As represented by block 504, the method 500 includes obtaining sensor data from the paired peripheral input device via the communication interface. As represented by block 506, in some implementations, the sensor data includes pressure sensor data characterizing a level of pressure associated with the paired peripheral input device. For example, the pressure sensor data is from a contact intensity sensor integrated in the paired peripheral input device. As an example, with reference to FIG. 2, the pressure sensor data is output from the contact intensity sensor(s) 268 of the paired peripheral input device 200. As another example, with reference to FIGS. 3A-3H, the electronic device 310 obtains, via the communication interface 313, the pressure sensor data 324 from the paired peripheral input device 320. As represented by block 507, in some implementations, the sensor data includes proximity sensor data indicating a proximity value associated with the paired peripheral input device. For example, the proximity value indicates a distance between the paired peripheral input device and a physical object.

As represented by block 508, in some implementations, the sensor data includes positional data, which the electronic device may use for tracking the paired peripheral input device. As an example, with reference to FIG. 2, the positional data is output from the positional sensor(s) 266 of the paired peripheral input device 200. As another example, with reference to FIGS. 3A-3H, the electronic device 310 obtains, via the communication interface 313, the positional data 326 from the paired peripheral input device 320. The positional data characterizes a position and/or orientation of the paired peripheral input device. As represented by block 510, in some implementations, the positional data includes IMU data from an IMU integrated in the paired peripheral input device. The IMU data may include a combination of accelerometer data, rotational data, and magnetic data. The accelerometer data may indicate movement (e.g., positional change) about a particular axis. The rotational data may indicate angular velocity about three axes, sometimes referred to as pitch (x axis), roll (y axis), and yaw (z axis). The magnetic data may indicate positional information, based on measured magnetic fields (e.g., detected fluctuations in Earth's magnetic field).

As represented by block 512, the method includes tracking, via a positional tracker, the paired peripheral input device in a first tracking mode. In some implementations, tracking the paired peripheral input device includes using a computer vision technique, such as is described with reference to the positional value identifier 426 illustrated in FIG. 4. As represented by block 514, in some implementations, tracking the paired peripheral input device is based on the positional data from the paired peripheral input device. For example, while in the first tracking mode the positional tracker uses the entirety of the accelerometer data and the entirety of the rotational data in order to perform six DOF tracking, as represented by block 516. In some implementations, the positional tracker performs a computer vision technique, in combination with the positional data, in order to perform the three six tracking. In some implementations, performing the six DOF tracking includes determining an x positional value associated with the paired peripheral input device, determining a y positional value associated with the paired peripheral input device, and determining a z positional value associated with the paired peripheral input device.

As represented by block 518, the method 500 includes determining, based on the sensor data, whether or not the paired peripheral input device satisfies a contact criterion. The contact criterion is based on a contact between the paired peripheral input device and a physical object. The physical object may include a substantially flat surface, such as a wall or a table surface. The physical object may include non-flat surfaces, such as when the physical object is a real-world basketball. In some implementations, determining that the contact criterion is satisfied includes determining that the pressure sensor data satisfies a pressure threshold. For example, with reference to FIG. 3F, the mode selector 315 detects satisfaction of the pressure threshold because the second pressure level ($P_2$) exceeds the threshold pressure level ($P_T$), as indicated within the pressure indicator 325. In some implementations, the pressure threshold is satisfied when the level of pressure exceeds a threshold level for a threshold amount of time. In some implementations, determining that the contact criterion is satisfied includes determining that the proximity sensor data indicates that a distance between the paired peripheral input device and the physical object is less than a threshold. For example, paired peripheral input device includes a laser-based proximity sensor that generates the proximity sensor data.

In accordance with a determination that the paired peripheral input device does not satisfy the contact criterion ("No" path), the method 500 reverts back to block 512, with the positional tracker continuing to track in the first tracking mode. On the other hand, in accordance with a determination that the paired peripheral input device satisfies the contact criterion ("No" path), the method 500 proceeds to block 520.

As represented by block 520, based on determining the satisfaction of the pressure criterion, the method 500 includes changing the positional tracker from the first tracking mode to a second tracking mode. For example, with reference to FIG. 3F, in response to determining that the second pressure level ($P_2$) exceeds the threshold pressure level ($P_T$), the mode selector 315 changes the positional tracker 316 from the first tracking model 315a to the second tracking model 315b. Tracking in the second tracking mode is based in part on a depth that indicates a distance between the electronic device and the physical object. To that end, in some implementations, based on determining the satisfaction of the pressure criterion, the method 500 includes identifying the physical object (e.g., via computer vision) that the paired peripheral input device contacts, and obtaining the depth that corresponds to the identified physical object. For example, in some implementations, an electronic device obtains the depth by extracting the depth from an environmental map of at least a portion of a physical environment. The portion of the physical environment includes the physical object. For example, the environmental map correspond to a SLAM map of a portion of a physical environment. In some implementations, the method 500 includes obtaining the environmental map before tracking the paired peripheral input device in the first tracking mode.

As represented by block 522, in some implementations, the method 500 includes tracking the paired peripheral input device in the second tracking mode, based in part on the depth. For example, an electronic device assigns the depth (distance between an electronic device and the physical object) as the z positional value of the paired peripheral input device. Accordingly, as represented by block 524, the method 500 includes foregoing determining a z positional value of the paired peripheral input device in the second tracking mode, resulting in five DOF tracking. For example, with reference to FIGS. 3F-3H, the positional tracker 316 tracks the paired peripheral input device 320 moving rightwards along the first physical wall 302, along the XY axis, but does not track the paired peripheral input device 320 along the Z axis (e.g., into or away from the first physical wall 302).

In some implementations, as represented by block 526, while in the second tracking mode the positional tracker processes a portion of the positional data from the paired peripheral input device. For example, the positional tracker processes a portion of the rotational data characterizing two of the three axes (e.g., XY axes), while ignoring the remainder of the rotational data associated with the third axis (e.g., Z axis). In some implementations, an electronic device transmits instructions to the paired peripheral input device to reduce the amount of positional data being transmitted, such as described with reference to the transmission manager 424 illustrated in FIG. 4. For example, the transmission instructions instruct the paired peripheral input device to transmit positional data characterizing 2D positional information, and cease transmitting positional data characterizing 3D positional information transmitted during the first tracking mode.

As represented by block 528, in some implementations, the method 500 includes performing a drawing operation with respect to (e.g., overlaid onto) the physical object based on the tracking of the paired peripheral input device in the second tracking mode. As represented by block 530, in some implementations, performing the drawing operation includes displaying, on a display, a drawing mark that is associated with the drawing operation. For example, with reference to FIGS. 3G and 3H, while the positional tracker 316 is tracking in the second tracking mode, the electronic device 310 displays, on the display 312, a drawing mark 352 that is based on the tracked rightwards movement 350 of the paired peripheral input device 320. In some implementations, performing the drawing operation is in response to determining that the pressure sensor data satisfies the pressure criterion. In some implementations, performing the drawing operation is in response to detecting a gesture, performed on the electronic device or on the paired peripheral input device. For example, a double tap gesture performed on the paired peripheral input device places the paired peripheral input device in a drawing mode. In some implementations, the method 500 includes using a 3D map in order to world lock the drawing mark to the physical object, such as via SLAM.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure.

The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including a communication interface to communicate with a paired peripheral input device, one or more processors, and non-transitory memory:
determining a distance between the electronic device and a physical object;
obtaining, from the paired peripheral input device via the communication interface, sensor data indicative of a distance between the paired peripheral input device and the physical object; and
determining a location of the paired peripheral input device based on (i) satisfaction of a criterion based on the sensor data and (ii) the distance between the electronic device and the physical object.

2. The method of claim 1, wherein the criterion is satisfied when the distance between the paired peripheral input device and the physical object is less than a threshold.

3. The method of claim 2, wherein the criterion is satisfied when the paired peripheral input device contacts the physical object.

4. The method of claim 1, further comprising:
determining that the paired peripheral input device does not satisfy the criterion based on the sensor data; and
determining the location of the paired peripheral input device independent of the sensor data.

5. The method of claim 1, further comprising:
before obtaining the sensor data, storing, in the non-transitory memory, the distance between the electronic device and the physical object;
identifying the physical object; and
obtaining, from the non-transitory memory, the distance between the electronic device and the physical object based on the identification.

6. The method of claim 5, further comprising obtaining an environmental map of at least a portion of a physical environment, wherein the portion of the physical environment includes the physical object, and wherein obtaining the distance between the electronic device and the physical object includes extracting a depth from the environmental map based on the identification.

7. The method of claim 6, wherein the environmental map corresponds to a three-dimensional (3D) map of at least the portion of the physical environment.

8. The method of claim 1, wherein determining the location of the paired peripheral input device includes determining a distance between the electronic device and the paired peripheral input device.

9. The method of claim 8, wherein determining the distance between the electronic device and the paired peripheral input device includes assigning the distance between the electronic device and the physical object as the distance between the electronic device and the paired peripheral input device.

10. The method of claim 1, wherein the sensor data includes pressure sensor data that characterizes a level of pressure associated with the paired peripheral input device.

11. The method of claim 10, wherein the pressure sensor data is from a contact intensity sensor of the paired peripheral input device.

12. The method of claim 1, wherein the sensor data includes proximity sensor data from a proximity sensor of the paired peripheral input device.

13. The method of claim 12, wherein the proximity sensor is a laser-based proximity sensor.

14. An electronic device comprising:
a communication interface to communicate with a paired peripheral input device;
a non-transitory memory; and
one or more processors to:
determine a distance between the electronic device and a physical object;
obtain, from the paired peripheral input device via the communication interface, sensor data indicative of a distance between the paired peripheral input device and the physical object; and
determine a location of the paired peripheral input device based on (i) satisfaction of a criterion based on the sensor data and (ii) the distance between the electronic device and the physical object.

15. The electronic device of claim 14, wherein the criterion is satisfied when the distance between the paired peripheral input device and the physical object is less than a threshold.

16. The electronic device of claim 15, wherein the criterion is satisfied when the paired peripheral input device contacts the physical object.

17. The electronic device of claim 14, wherein the one or more processors are further to:
determine that the paired peripheral input device does not satisfy the criterion based on the sensor data; and
determine the location of the paired peripheral input device independent of the sensor data.

18. The electronic device of claim 14, wherein the one or more processors are to determine the location of the paired peripheral input device by determining a distance between the electronic device and the paired peripheral input device.

19. The electronic device of claim 18, wherein the one or more processors are to determine the distance between the electronic device and the paired peripheral input device by assigning a distance between the electronic device and the physical object as the distance between the electronic device and the paired peripheral input device.

20. A non-transitory computer-readable medium having instructions encoded thereon which, when executed by one or more processors of an electronic device including a communication interface to communicate with a paired peripheral input device, cause the electronic device to:
determine a distance between the electronic device and a physical object;
obtain, from the paired peripheral input device via the communication interface, sensor data indicative of a distance between the paired peripheral input device and the physical object; and
determine a location of the paired peripheral input device based on (i) satisfaction of a criterion based on the sensor data and (ii) the distance between the electronic device and the physical object.

* * * * *